United States Patent
Salunke et al.

(10) Patent No.: US 11,144,425 B1
(45) Date of Patent: Oct. 12, 2021

(54) SYSTEMS AND METHODS FOR CROWDSOURCED APPLICATION ADVISORY

(71) Applicant: Symantec Corporation, Mountain View, CA (US)

(72) Inventors: Nikhil Salunke, Pune (IN); Radoslav Stanev, Tehachapi, CA (US); Sudhir Kumar, Patna (IN)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 16/457,593

(22) Filed: Jun. 28, 2019

(51) Int. Cl.
*G06F 15/173* (2006.01)
*G06F 11/34* (2006.01)
*G06F 8/61* (2018.01)
*G06F 11/30* (2006.01)

(52) U.S. Cl.
CPC ............ *G06F 11/3438* (2013.01); *G06F 8/62* (2013.01); *G06F 11/302* (2013.01)

(58) Field of Classification Search
CPC ...... G06F 3/0488; G06F 8/71; G06F 11/3006; G06F 21/51; G06F 21/52; G06F 21/10; G06F 21/53; G06F 21/562; G06F 16/24575; G06F 8/65; G06F 9/453; H04L 63/1425; H04L 67/04; H04W 12/002; H04W 4/50; G06Q 30/0251; G06Q 30/0278
USPC ........................................................ 709/224
See application file for complete search history.

(56) References Cited

U.S. PATENT DOCUMENTS

| | | | | |
|---|---|---|---|---|
| 2010/0198838 | A1* | 8/2010 | Stamper | G06F 9/453 707/748 |
| 2011/0225649 | A1* | 9/2011 | Bhogal | G06F 21/53 726/22 |
| 2012/0072283 | A1* | 3/2012 | DeVore | G06Q 30/0251 705/14.49 |
| 2012/0072991 | A1* | 3/2012 | Belani | H04W 4/50 726/25 |
| 2012/0240236 | A1* | 9/2012 | Wyatt | G06F 21/10 726/25 |
| 2012/0317266 | A1* | 12/2012 | Abbott | G06Q 30/0278 709/224 |

(Continued)

OTHER PUBLICATIONS

Talbot, David, "Using Crowdsourcing to Protect Your Privacy", URL: https://mittr-frontend-prod.herokuapp.com/s/427390/using-crowdsourcing-to-protect-your-privacy/amp/, Apr. 2, 2012, pp. 1-3.

*Primary Examiner* — Dustin Nguyen
(74) *Attorney, Agent, or Firm* — FisherBroyles, LLP

(57) ABSTRACT

The disclosed computer-implemented method for crowd sourced application advisory may include determining at least one characteristic associated with an application, collecting, from a plurality of computing devices, a sentiment associated with the application, wherein the sentiment reflects an assessment of the application in light of the at least one characteristic by at least one user of the application, presenting, via a user interface, the at least one characteristic associated with the application, the presentation of the at least one characteristic being modified by the sentiment collected from the plurality of computing devices, and receiving, via the user interface, at least one of a decision to install the application or a decision to uninstall the application. Various other methods, systems, and computer-readable media are also disclosed.

20 Claims, 9 Drawing Sheets

(56) References Cited

U.S. PATENT DOCUMENTS

| | | | |
|---|---|---|---|
| 2013/0055401 A1* | 2/2013 | Kim | G06F 21/52 726/25 |
| 2013/0072177 A1* | 3/2013 | Ross | H04L 67/04 455/418 |
| 2013/0185292 A1* | 7/2013 | Li | G06F 21/562 707/723 |
| 2013/0227683 A1* | 8/2013 | Bettini | G06F 21/53 726/22 |
| 2013/0333039 A1* | 12/2013 | Kelly | G06F 21/51 726/24 |
| 2014/0173586 A1* | 6/2014 | Dugan | G06F 8/65 717/173 |
| 2016/0162270 A1* | 6/2016 | Kumar | G06F 3/0488 717/177 |
| 2016/0162551 A1* | 6/2016 | Liu | G06F 16/24575 707/748 |
| 2016/0179498 A1* | 6/2016 | Das | G06F 8/65 717/171 |
| 2017/0155673 A1* | 6/2017 | Desai | H04L 63/1425 |
| 2017/0372066 A1* | 12/2017 | Deng | G06F 8/71 |
| 2018/0143891 A1* | 5/2018 | Polisetty | G06F 11/3006 |
| 2019/0138431 A1* | 5/2019 | Holbrook | G06F 11/3684 |
| 2019/0174319 A1* | 6/2019 | Backholm | H04W 12/002 |

\* cited by examiner

SYSTEMS AND METHODS FOR CROWDSOURCED APPLICATION ADVISORY

BACKGROUND

Conventional mobile security products may have the ability to provide information to a user about specific characteristics of an application that may help the user in deciding whether to install the application on the user's computing device. The characteristics may be associated with determining whether the application is malware, malicious code, a security risk, or has undesirable performance effects. Advising the user of the presence or absence of these characteristics may affect the user's decision about whether to install, uninstall, or avoid the application.

In conventional mobile security products characteristics of the application may be based on a static analysis. Users may be presented with an application advisory based on the static analysis of the application. A user's decision whether to install the application based on the static analysis of the characteristics may remain private. Further, the particular characteristics of the application driving the user's decision whether to install the application may also remain private. The present disclosure, therefore, identifies and addresses a need for systems and methods for crowd sourced application advisory.

SUMMARY

As will be described in greater detail below, the present disclosure describes various systems and methods for crowd sourced application advisory.

In one example, a method for crowd sourced application advisory may include determining at least one characteristic associated with an application. The method may further include collecting, from a plurality of computing devices, a sentiment associated with the application, wherein the sentiment reflects an assessment of the application in light of the at least one characteristic by at least one user of the application. The method may further include presenting, via a user interface, the at least one characteristic associated with the application, the presentation of the at least one characteristic being modified by the sentiment collected from the plurality of computing devices, and receiving, via the user interface, a decision to install the application.

In some examples, the sentiment may include data indicating whether the application was installed on the plurality of computing devices.

In some examples, the method may further include determining that the user of the application installed the application, wherein the user of the application installed the application based on the least one characteristic associated with the application, and updating the sentiment associated with the application based on determining that the user of the application installed the application.

In some examples, the method may further include collecting, from the plurality of computing devices, the at least one characteristic associated with the application that the application installation decision is based on.

In some examples, the method may further include determining a degree to which the sentiment influences the application installation decision.

In some examples, the sentiment collected from the plurality of computing devices is collected during a set recent time period and the sentiment reflects an assessment of the application during the set recent time period.

In some examples, the method may further include assigning a weight to at least two characteristics associated with the application, wherein the weights assigned to the at least two characteristics are used to determine at least two characteristics associated with a second application.

In some examples, the second application has a sentiment collected from less than a threshold number of computing devices and the weights assigned to the at least two characteristics associated with the second application reflect a sentiment associated with the second application.

In some examples, the at least one characteristic associated with an application may comprise at least one of a battery current consumption, a network data usage, a frequency of advertisement presentation, a frequency of pop-up windows, a memory storage usage, and a level of data privacy.

In some examples, the sentiment may be measured by a ratio of a number of users of the plurality of computing devices that have installed the application to a number of users of the plurality of computing devices that have not installed the application.

In one embodiment, a system for crowd sourced application advisory may include at least one physical processor and physical memory that includes computer-executable instructions that, when executed by the physical processor, cause the physical processor to determine at least one characteristic associated with an application. The instructions may further cause the physical processor to collect, from a plurality of computing devices, a sentiment associated with the application, wherein the sentiment reflects an assessment of the application in light of the at least one characteristic by at least one user of the application. The instructions may further cause the physical processor to present, via a user interface, the at least one characteristic associated with the application, the presentation of the at least one characteristic being modified by the sentiment collected from the plurality of computing devices, and receive, via the user interface, a decision to install the application.

In some examples, the sentiment may include data indicating whether the application was installed on the plurality of computing devices.

In some examples, the system may further include determining that the user of the application installed the application, wherein the user of the application installed the application based on the least one characteristic associated with the application, and updating the sentiment associated with the application based on determining that the user of the application installed the application.

In some examples, the system may further include collecting, from the plurality of computing devices, the at least one characteristic associated with the application that the application installation decision is based on.

In some examples, the system may further include determining a degree to which the sentiment influences the application installation decision.

In some examples, the sentiment collected from the plurality of computing devices is collected during a set recent time period and the sentiment reflects an assessment of the application during the set recent time period.

In some examples, the system may further include assigning a weight to at least two characteristics associated with the application, wherein the weights assigned to the at least two characteristics are used to determine at least two characteristics associated with a second application.

In some examples, the second application has a sentiment collected from less than a threshold number of computing devices and the weights assigned to the at least two characteristics associated with the second application reflect a sentiment associated with the second application.

In some examples, the at least one characteristic associated with the application comprises at least one of a battery current consumption, a network data usage, a frequency of advertisement presentation, a frequency of pop-up windows, a memory storage usage, and a level of data privacy.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to determine at least one characteristic associated with an application. The computer-executable instructions when executed by the at least one processor of the computing device may collect, from a plurality of computing devices, a sentiment associated with the application, wherein the sentiment reflects an assessment of the application in light of the at least one characteristic by at least one user of the application. The computer-executable instructions when executed by at least one processor of a computing device may present, via a user interface, the at least one characteristic associated with the application, the presentation of the at least one characteristic being modified by the sentiment collected from the plurality of computing devices, and receive, via the user interface, a decision to install the application.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
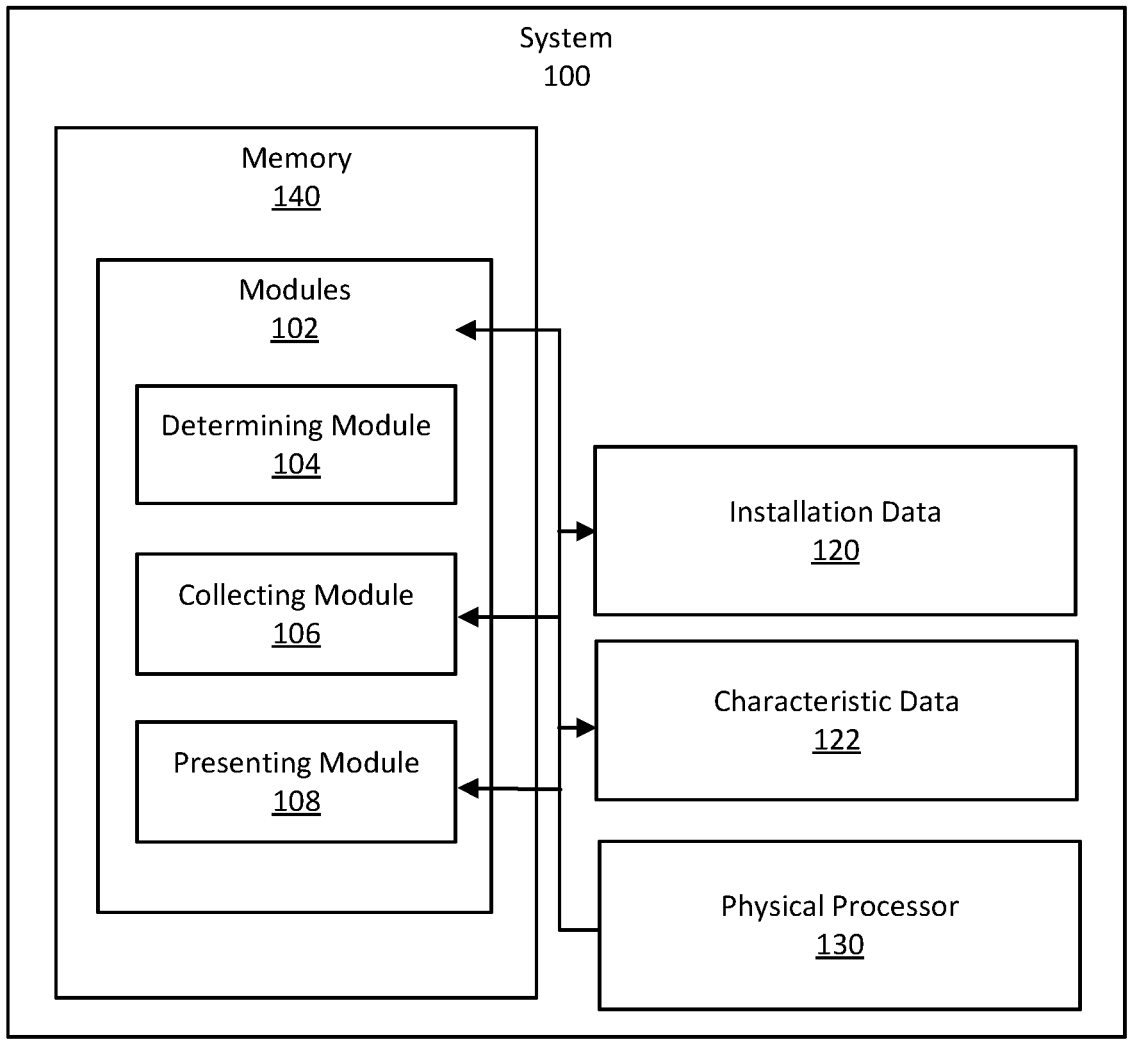
FIG. 1 is a block diagram of an example system for crowd sourced application advisory.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for crowd sourced application advisory. As will be explained in greater detail below, by determining a sentiment and characteristics of an application through crowd sourcing, the systems and methods described herein may be able to present the sentiments and characteristics of the application to a user so that the user may execute a decision as to whether to install the application in a computing device.

By presenting the sentiments and characteristics of the application in this way, the systems and methods described herein may be able to improve the operation of the computing device. In particular, the systems and methods described herein may improve the security of user data on the computing device by informing the user of the extent to which the application shares data with other entities. The systems and methods described herein may also improve the battery life of a mobile computing device by informing the user of the extent to which the application consumes battery power. The systems and methods described herein may also improve the operation of a network connected to the computing device by informing the user of the extent to which the application uses network data. Further, the systems and methods described herein may improve the experience of a user operating the computing device by informing the user of the amount of advertising the application presents to the user.

Figure 2:
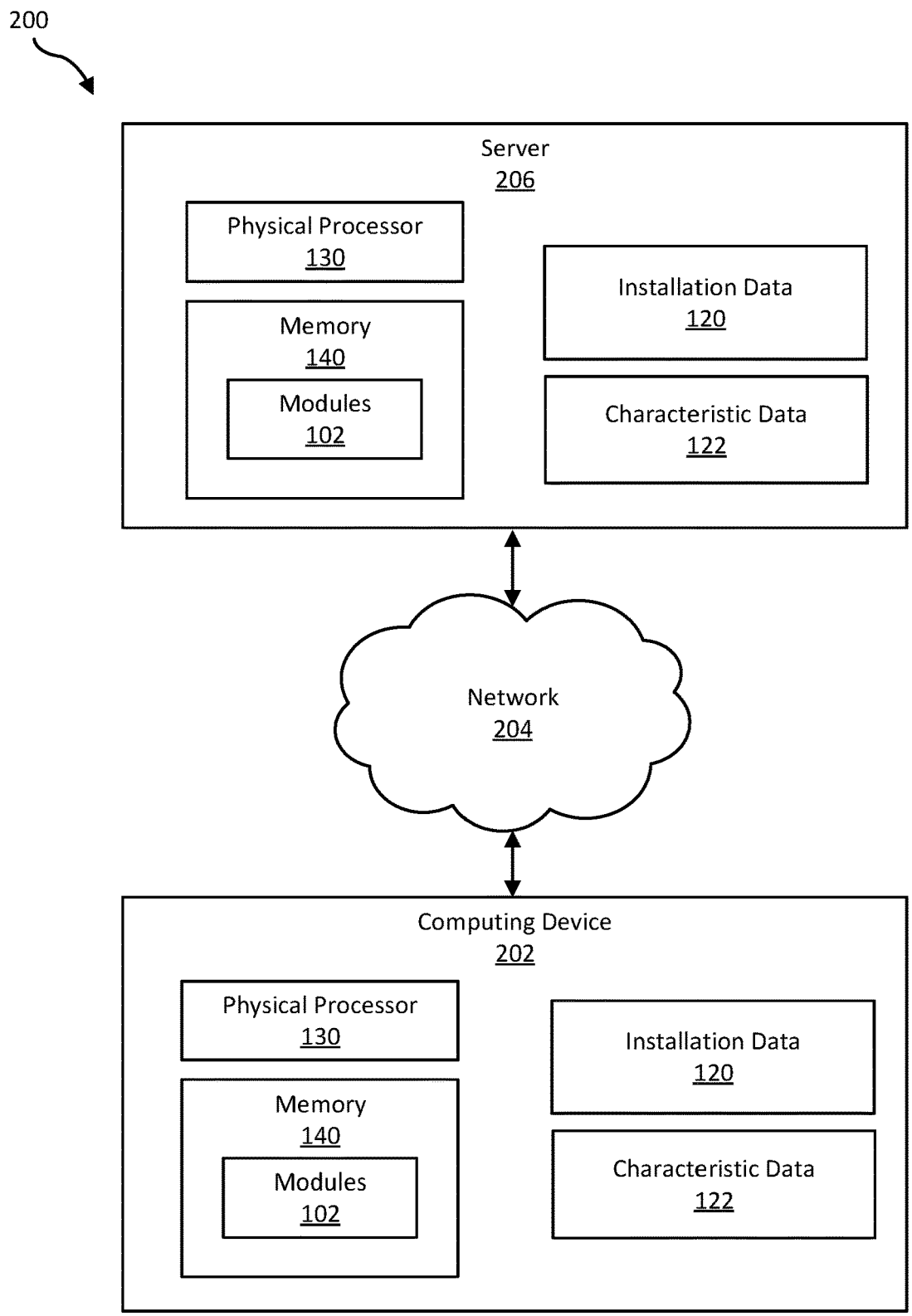
FIG. 2 is a block diagram of an additional example system for crowd sourced application advisory.

The following will provide, with reference to FIGS. 1-2, detailed descriptions of example systems for crowd sourced application advisory. Detailed descriptions of corresponding computer-implemented methods for providing a sentiment and characteristics of applications to users will also be provided in connection with FIGS. 3-7. In addition, detailed descriptions of an example computing system and network architecture capable of implementing one or more of the embodiments described herein will be provided in connection with FIGS. 8 and 9, respectively.

FIG. 1 is a block diagram of an example system 100 for crowd sourced application advisory. As illustrated in this figure, example system 100 may include one or more modules 102 for performing one or more tasks. As will be explained in greater detail below, modules 102 may include a determining module 104, a collecting module 106, and a presenting module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate crowd sourced application advisory. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more data storage elements, such as installation data 120 and characteristic data 122. Installation data 120 generally represents any type or form of memory storage that stores data associated with the installation of applications by users. In one example, installation data 120 may store actions associated with the installation of an application by users. Examples of installation data 120 include, without limitation, an application identifier, a user(s) identifier, an application installation action (e.g., application installed, application not installed, application uninstalled, etc.), a data and time of installation action, demographics (e.g., age, race, ethnicity, gender, marital status, income, education, and employment) of user(s), and characteristics of the application that influenced the application installation action. Characteristic data 122 generally represents any type or form of memory storage that stores data associated with the characteristics of the application(s). In one example, characteristic data 122 may store characteristic data associated with the application(s) generated by an analysis of the application. Examples of characteristic data 122 include, without limitation, power consumed by a computing device running the application, network data consumed by the application, an amount and/or type of user data shared by the application, an amount of advertising presented to the user, and an amount of memory storage consumed by the application.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to present a crowdsourced application advisory. For example, and as will be described in greater detail below, one or more of modules 102 may cause computing device 202 and/or server 206 to determine at least one characteristic data 120 associated with an application, collect, from a plurality of computing devices 202, a sentiment associated with the application, and present, on computing device 202, the sentiment associated with the application and the at least one characteristic data 122 associated with the application.

Computing device 202 generally represents any type or form of computing device capable of reading computer-executable instructions. Computing device 202 may be a smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of determining characteristics of an application, collecting application installation data from multiple users, and presenting the characteristics of the application and the collected application installation data to a computing device. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Installation data 120 generally represents any type or form of memory storage that stores data associated with the installation of applications by users. In one example, installation data 120 may store actions associated with the installation of an application by users. Examples of installation data 120 include, without limitation, an application identifier, user(s) identifier, an application installation action (e.g., application installed, application not installed, application uninstalled, etc.), a data and time of installation action, demographics of user(s), and characteristics of application that influenced the application installation action. Characteristic data 122 generally represents any type or form of memory storage that stores data associated with the characteristics of the application(s). In one example, characteristic data 122 may store characteristic data associated with the application(s) generated by an analysis of the application. Examples of characteristic data 122 include, without limitation, power consumed by a computing device running the application, network data consumed by the application, an amount and/or type of user data shared by the application, an amount of advertising presented to the user, and an amount of memory storage consumed by the application.

Figure 3:
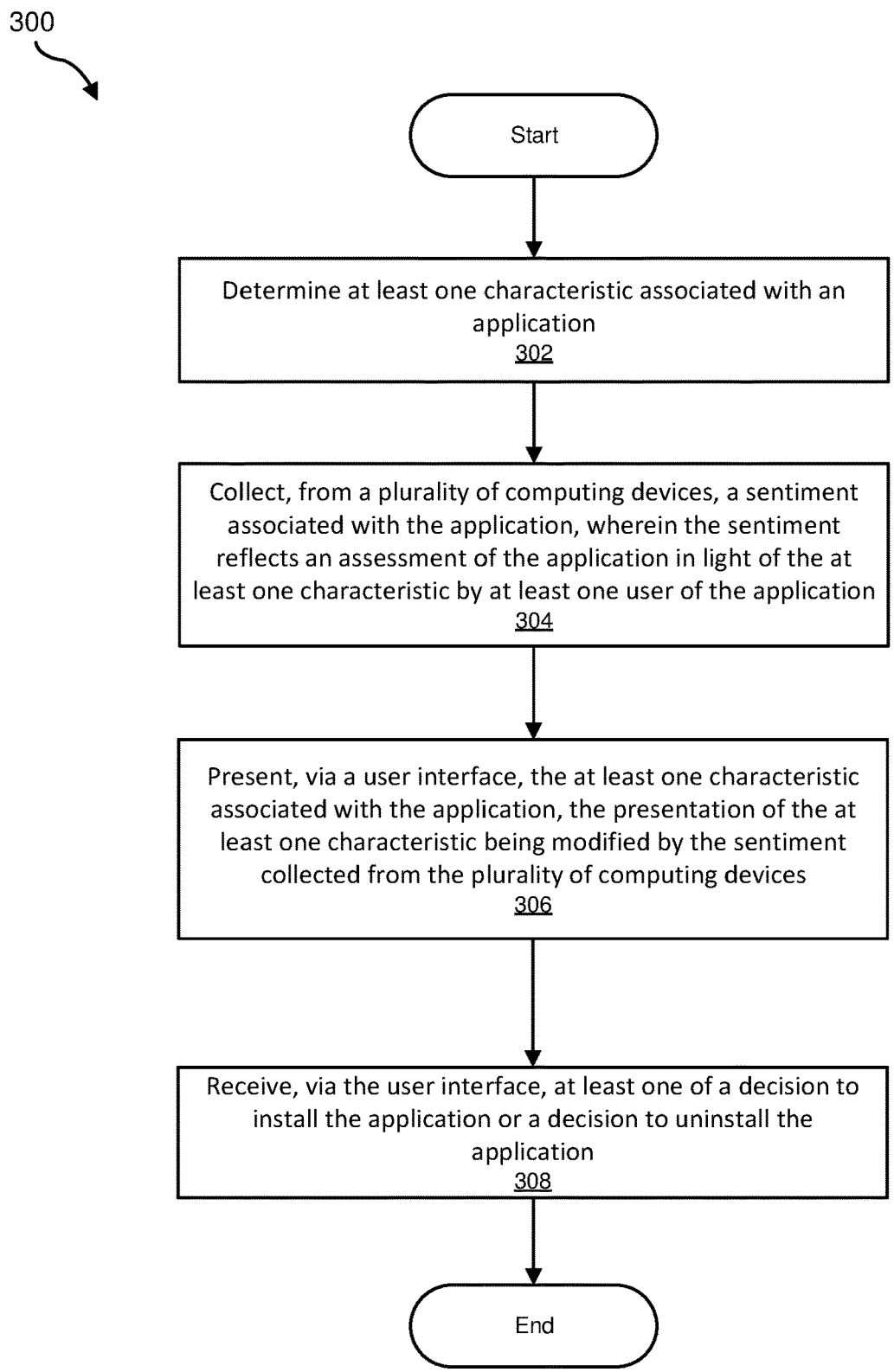
FIG. 3 is a flow diagram of an example method for crowd sourced application advisory.

FIG. 3 is a flow diagram of an example computer-implemented method 300 for crowd sourced application advisory. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may determine at least one characteristic associated with an application. For example, determining module 104 may, as part of server 206 and/or computing device 202 in FIG. 2, determine at least one characteristic associated with an application that may be installed and/or run on computing device 206. Determining module 104 in computing device 202 may determine an amount of resources used by the application. Determining module 104 in computing device 202 may determine an amount of resources that are important and/or valuable to a user of computing device 202. For example, determining module 104 in computing device 202 may determine a network data usage (e.g., amount of consumed bandwidth) associated with the application. A user of computing device 202 may subscribe to a network service that charges the user based on the amount of data transferred over a network and therefore the user may consider network data usage a valuable resource and desire to reduce network data usage by the application. Determining module 104 in computing device 202 may monitor the amount of data transmitted over a network (e.g., wireless network) that is associated with the application to determine network data usage. Determining module 104 may store the network data usage associated with the application in characteristic data 122.

In some examples, determining module 104 in computing device 202 may determine a power consumption (e.g., battery power consumption) associated with the application. Computing device 202 may be powered by a battery. The battery may have a limited power capacity. A user of computing device 202 may consider battery power in computing device 202 a valuable resource and desire to reduce power consumption by applications running on computing device 202. Determining module 104 in computing device 202 may monitor the amount of power (e.g., battery current) consumed by the application running on computing device 202. Determining module 104 may store the power consumption associated with the application in characteristic data 122.

In some examples, determining module 104 in computing device 202 may determine a memory storage used (e.g., amount of volatile and/or non-volatile memory used) by the application. Computing device 202 may have a limited amount of memory storage. A user of computing device 202 may consider memory storage in computing device 202 a valuable resource and desire to reduce the amount of memory used by applications running on computing device 202. Determining module 104 in computing device 202 may monitor the amount of memory (e.g., number of bytes) consumed by the application running on computing device 202. Determining module 104 may store the amount of memory storage used by the application in characteristic data 122.

In some examples, determining module 104 in computing device 202 may determine a level of data privacy associated with the application. Applications may share private user data with entities the user does not desire to share the data with. Applications may monitor data entered by the user and/or scan computing device 202 for private user data and transmit the private user data to entities known or unknown to the user. The user may have preferences for what private data is shared and/or which entities the data is shared with. A user of computing device 202 may desire to know what data is being shared by an application and/or what entities the data is being shared with. Determining module 104 in computing device 202 may determine, without limitation, the amount of data shared by the application, the type of data shared by the application, the number of entities the data is shared with, the types of entities the data is shared with, and a geographic location(s) of the entities the data is shared with. Determining module 104 may store information associated with the application data sharing in characteristic data 122.

In some examples, determining module 104 in computing device 202 may determine an amount of advertisements associated with the application. Applications may present advertisements (e.g. pop-up window ads) on a screen of computing device 202 that the user does not desire to view. Users may consider the screen area of computing device 202 a valuable resource and do not want advertisements associated with the application to consume any of the screen area. A user of computing device 202 may desire to know the amount of advertisements that may be presented on the screen of computing device 202 when the application is installed and running. Determining module 104 in computing device 202 may determine, without limitation, the amount of advertisements presented to the user, the frequency of advertisements presented to the user, and the source of advertisements (e.g., identification of the advertisers) presented to the user. Determining module 104 may store information associated with advertisements presented to the user in characteristic data 122.

At step 304 one or more of the systems described herein may collect (e.g., crowdsource), from a plurality of computing devices 202, a sentiment associated with the application. For example, collecting module 106 may, as part of server 206 and/or computing device 202 in FIG. 2, collect a sentiment associated the application from a plurality of computing devices 202. Collecting module 106 may, as part of server 206 collect data from a plurality of computing devices 202 including, without limitation, a user sentiment associated with the application, whether a user of computing device 202 installed the application, whether a user of computing device 202 installed the application after receiving a sentiment and/or characteristic data associated with the application, which characteristic data and/or sentiment influenced the user's decision to install or not install the application, and how much influence each of the characteristics of the characteristic data influenced the user's decision to install or not install the application. The user sentiment associated with the application may include sentiment collected from a threshold number of users reflecting the general, average, or weighted average opinion of the users towards the application. A user's sentiment towards the application may be based on the characteristic data of the application and/or the user's experience of the application. Collecting module 106 may collect user sentiment associated with the application and application installation data from a plurality of computing devices 202 over a network. In some examples, collecting module 106 may collect sentiment associated with the application and application installation data from a plurality of computing devices 202 over a virtual private network, a wireless network, a wired network, or a combination thereof. Collecting module 106 may store the collected application installation data in installation data 120.

In some examples, once collecting module 106 has collected a minimum amount (e.g., above a threshold) of sentiment data associated with the application and/or application installation data, presenting module 108 may present the sentiment associated with the application and/or application installation data to a user of computing device 202 to assist the user in deciding whether to install the application. The sentiment associated with the application and/or application installation data 120 may be presented to the user in the form of statistics indicating the number of users that have installed the application, the number of users that have chosen not to install the application, or a ratio (e.g., percent) of users that have chosen to install or not install the application. Additionally or alternatively, sentiment associated with the application and/or application installation data 120 presented to the user may include the application characteristic data 122 that influenced the user's installation decision.

At step 306, presenting module 108 may present, on computing device 202, the at least one characteristic associated with the application, the presentation of the at least one characteristic being modified by the sentiment collected from the plurality of computing devices. Presenting module 108 may present at least one characteristic associated with the application, a sentiment associated with the application, the installation data collected from the plurality of computing devices 202, or a combination thereof. Presenting module 108 may present characteristic data 122 of resources associated with the application that are important and/or valuable to a user of computing device 202. As described in detail above, characteristic data 122 may be determined by determining module 104. For example, presenting module 108 may present characteristic data to a user including, without limitation, network data usage (e.g., consumed bandwidth) associated with the application, the amount of power (e.g., battery current) consumed by the application, the amount of memory storage consumed by the application, the amount of data shared by the application, the type of data shared by the application, the number of entities the data is shared with, the types of entities the data is shared with, a geographic location(s) of the entities the data is shared with, an amount of advertisements presented to the user, or a combination thereof. Presenting module 108 may present characteristic data to a user in formats described in detail below with respect to FIGS. 4-7. At step 308, computing device 202 and/or server 206 may receive, via a user interface, a decision to install the application or a decision to uninstall the application. In some examples, a user may install an application on computing device 202. The user may subsequently install an application advisor that provides the user with a sentiment associated with the application. The sentiment associated with the application may be provided to the user according to the formats described in detail below with respect to FIGS. 4-7. The user may decide to uninstall the application based on the sentiment associated with the application. The user's decision to uninstall the application may be stored in installation decision module 120.

In some examples, collecting module 106 may assign a decision weight to each of the characteristics of the application. The weights may be determined using any suitable method. For examples, the weight assignments may be evenly distributed. The weights may be assigned based on the installation data that indicates which characteristics of the application have influenced users. For example, in the case of three different applications, each application may have different characteristics with different weightings. For example, application A may have characteristics of high network usage and average battery usage, application B may have characteristics of high battery usage and average network usage, and application C may have characteristics of high network usage and high battery usage. If a sufficient amount of data has been collected with respect to applications A and B, and the data collected by collecting module 106 indicates that application B is being installed by a percentage of users that is higher than the percentage of users installing application A, then the characteristics of applications A and B may be proportionally distributed to the characteristics of application C when there is a limited amount of data collected on application C. The weights assigned to the characteristics which determine user sentiment about applications with a sufficient amount of collected data (e.g. a statistically significant amount) may be used to adjust the weights assigned to the characteristics of applications without a sufficient amount of collected data (e.g., new applications). In some examples, the collection of data associated with the application and the weights assigned to the characteristics may be performed over a recent time period (e.g., previous week, previous month, previous year) in order to reflect a relatively current view of the user sentiment towards the application which may change based upon conditions outside the control of the application developer (e.g., unlimited network data plans, new battery technologies, more efficient application processors, etc.).

Figure 4:
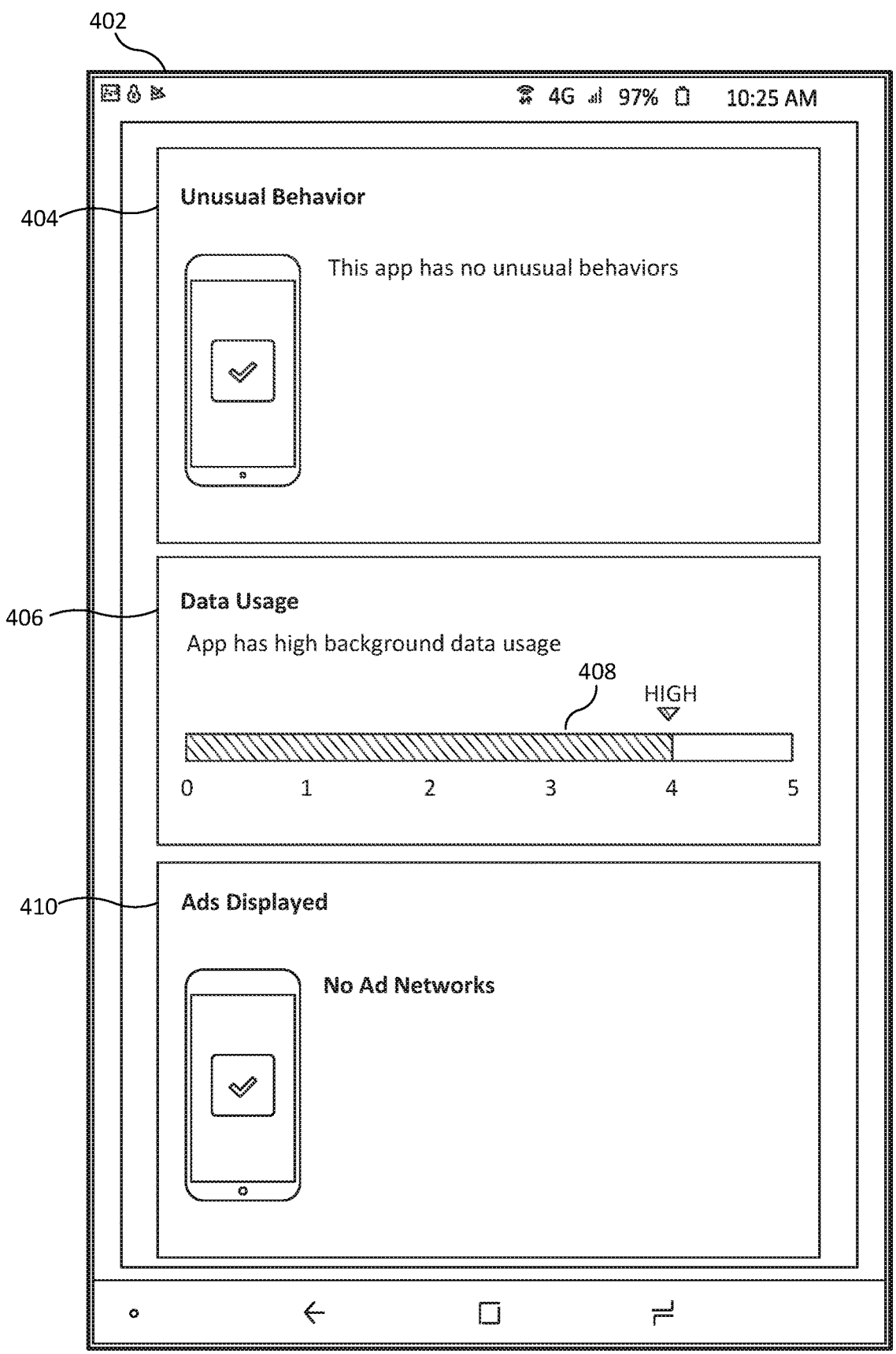
FIG. 4 is a screen display of an application advisory showing application data usage.

FIG. 4 is a screen display of a crowd sourced application advisory showing application data usage. Referring to FIG. 4, screen 402 may display a sentiment associated with an application. Screen 402 may be displayed on computing device 202. The sentiment associated with the application may reflect an assessment of the application by users and provide other users with information that is useful in deciding whether to install the application on computing device 202. Screen 402 may display characteristic data and/or installation data that reflects the sentiment of users of the application. For example, screen 402 may display window 404 that indicates any unusual behavior (e.g., application crashes the computing device, causes other applications to be non-responsive) that may be associated with the application. Screen 402 may also display window 406 that indicates the amount of data transmitted and/or received by the application over a network connected to computing device 202. Window 406 may include bar graph 408 that provides the relative amount of data used by the application as compared to other applications. Window 406 may also indicate an absolute amount of data (e.g., number of bytes and/or number of bytes per second) used by the application. In some examples, screen 402 may also display window 410 that indicates the amount of advertisements displayed as a result of running the application on computing device 202. Window 410 may indicate the amount of advertisements presented to the user, the frequency of advertisements presented to the user, and the source of advertisements (e.g., identification of the advertisers) presented to the user.

Figure 5:
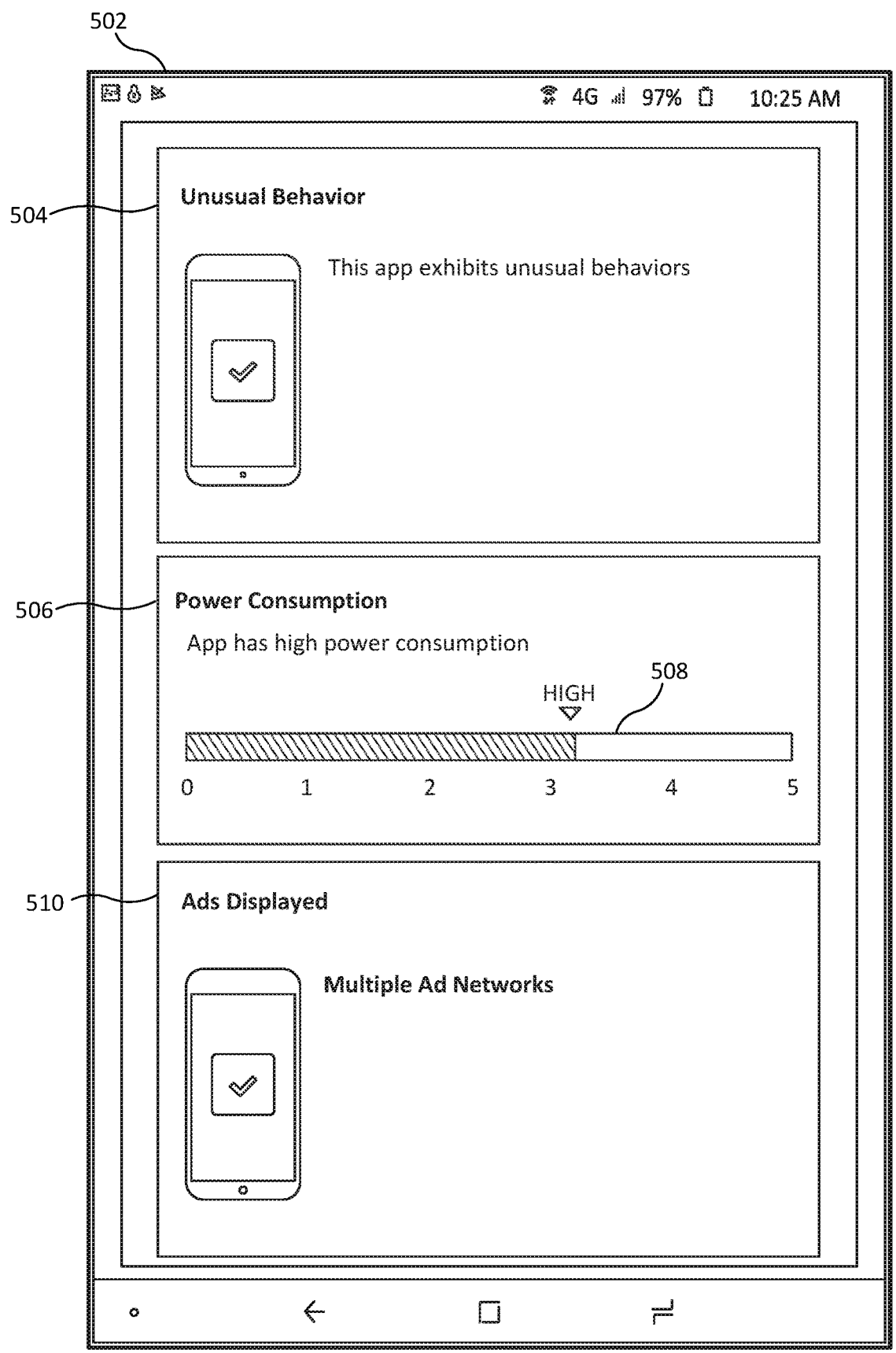
FIG. 5 is a screen display of an application advisory showing application power consumption.

FIG. 5 is a screen display of an application advisory showing application power consumption. Referring to FIG. 5, screen 502 may display a sentiment associated with an application. Screen 502 may be displayed on computing device 202. The sentiment associated with the application may reflect an assessment of the application by users and provide other users with information useful in deciding whether to install the application on computing device 202. Screen 502 may display characteristic data and/or installation data that reflects the sentiment of users of the application. For example, screen 502 may display window 504 that indicates any unusual behavior (e.g., application crashes computing device, causes other applications to be non-responsive) that may be associated with the application. Window 504 may display an icon and/or text describing any unusual behavior of the application. Screen 502 may also display window 506 that indicates the amount of power (e.g., battery power) consumed by running the application. Window 506 may include bar graph 508 that provides a relative amount of power consumed by the application as compared to other applications on a scale (e.g., 1 to 5 scale). Window 506 may also indicate an absolute amount of power (e.g., watts and/or current per unit time) consumed by the application. In some examples, screen 502 may also display window 510 that indicates the amount of advertisements displayed as a result of running the application on computing device 202. Window 510 may display an icon and/or a text description indicating the amount of advertisements presented to the user, the frequency of advertisements presented to the user, and the source of advertisements (e.g., identification of the advertisers) presented to the user.

Figure 6:
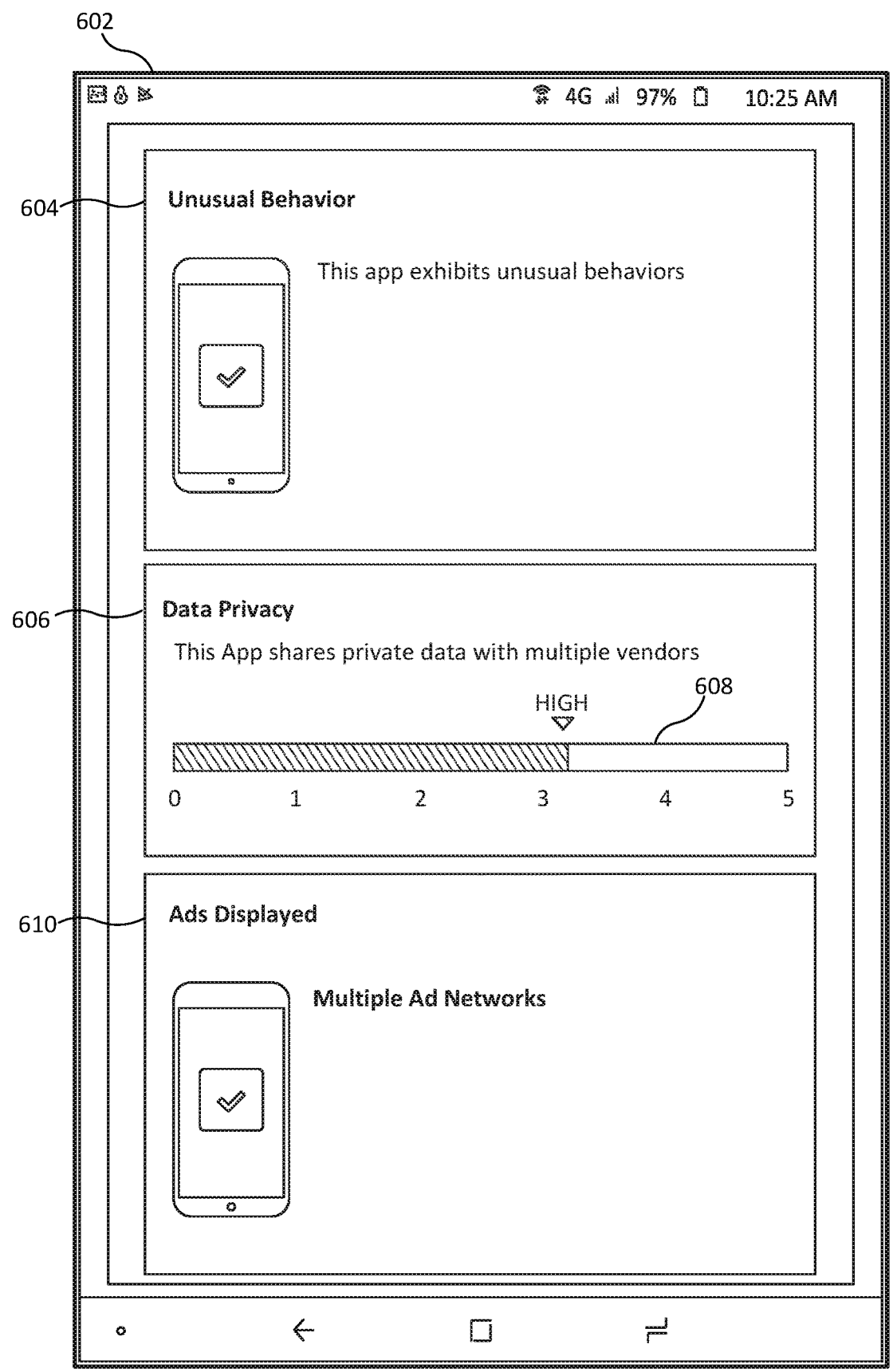
FIG. 6 is a screen display of an application advisory showing application data privacy.

FIG. 6 is a screen display of an application advisory showing application data privacy. Referring to FIG. 6, screen 602 may display a sentiment associated with an application on computing device 202. The sentiment associated with the application may reflect an assessment of the application by users and provide other users with information useful in deciding whether to install the application on computing device 202. Screen 602 may display characteristic data and/or installation data that reflects the sentiment of users of the application. For example, screen 602 may display window 604 that indicates any unusual behavior (e.g., application crashes computing device, causes other applications to be non-responsive) that may be associated with the application. Window 604 may display an icon and/or text describing any unusual behavior of the application. Screen 602 may also display window 606 that indicates the amount of private data (e.g., private data of the user) that is shared with entities (e.g., vendors) as a result of running the application on computing device 202. Window 606 may include bar graph 608 that indicates a relative amount of data shared by the application with entities as compared to other applications on a scale (e.g., 1 to 5 scale). Window 606 may also indicate the amount of data shared by the application, the type of data shared by the application, the number of entities the data is shared with, the types of entities the data is shared with, and a geographic location(s) of the entities the data is shared with. In some examples, screen 602 may also display window 610 that indicates the amount of advertisements displayed as a result of running the application on computing device 202.

Figure 7:
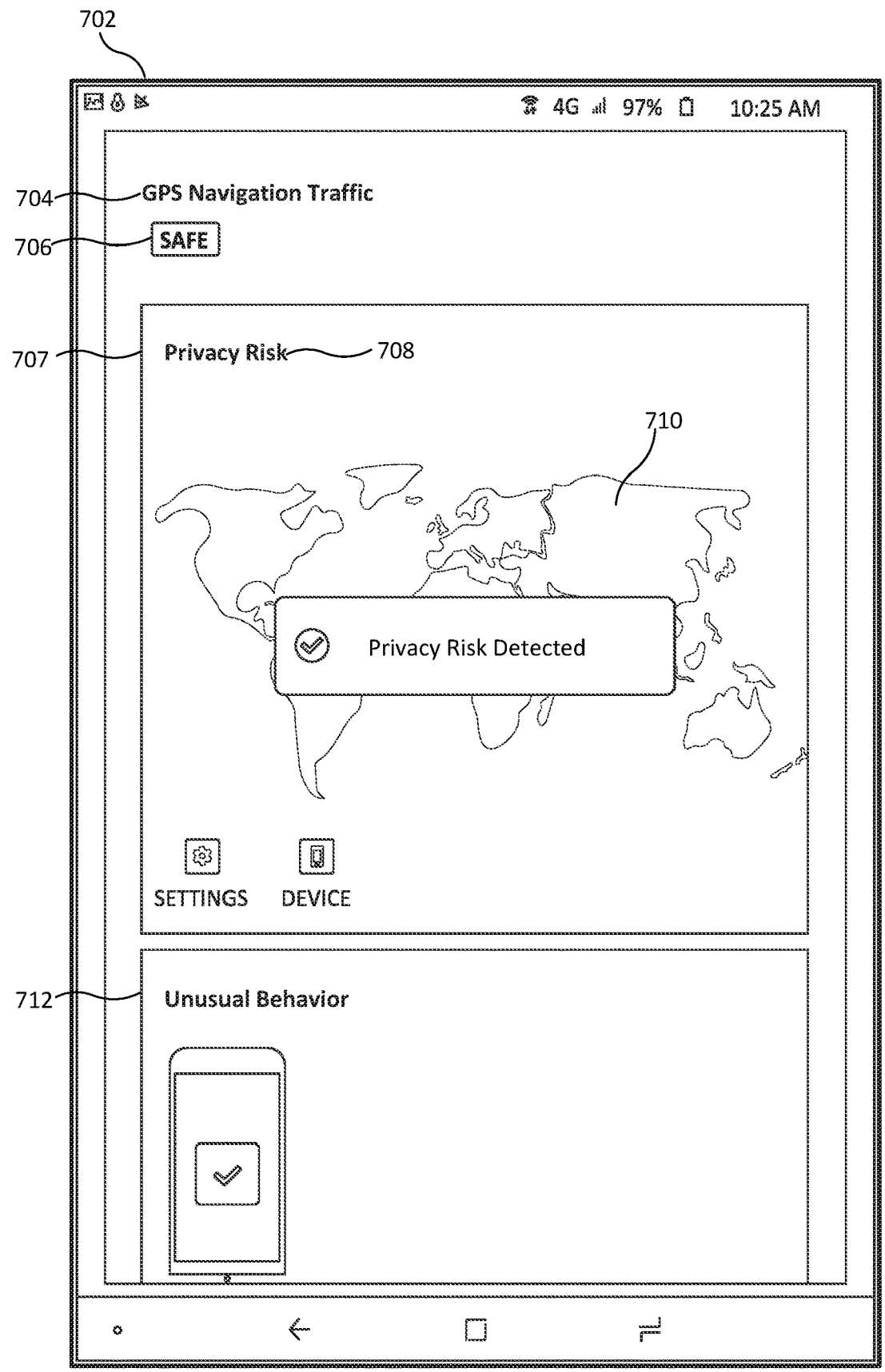
FIG. 7 is a screen display of an application advisory showing geographic regions where application data is shared.

FIG. 7 is a screen display of an application advisory showing geographic regions where application data is shared. Referring to FIG. 7, screen 702 may display a sentiment associated with an application on computing device 202. Screen 702 may display characteristic data and/or installation data that reflects the sentiment of users of the application. For example, screen 702 may display application name 704 that indicates the name of the application (e.g., "GPS Navigation Traffic") to which the sentiment data is associated. Risk indicator 706 may indicate a level of risk associated with the application (e.g., safe, unsafe). The level of risk may be determined based on the amount of private user data shared by the application and/or the geographic locations of the entities the private user data is shared with. Screen 702 may also include window 707 that includes details regarding a privacy risk associated with the application. Window 707 may include alert 708 (e.g., "Privacy Risk") that indicates whether a privacy risk has been detected. Window 707 may also show a map of geographic regions in which entities reside that the application has shared private user data with. For example, country 710 may include entities (e.g., vendors) that the application has shared private data with.

A user of a computing device may execute a decision whether to install an application on a computing device based on a collective sentiment of the application. The sentiment may be determined based on a crowd-sourced collection of data reflecting an assessment of the application. A user's application installation decision may be further based on characteristics of the application that affect valuable resources of the computing device. In some examples, a user may be presented with the collective sentiment and characteristics before making the application installation decision.

Figure 8:
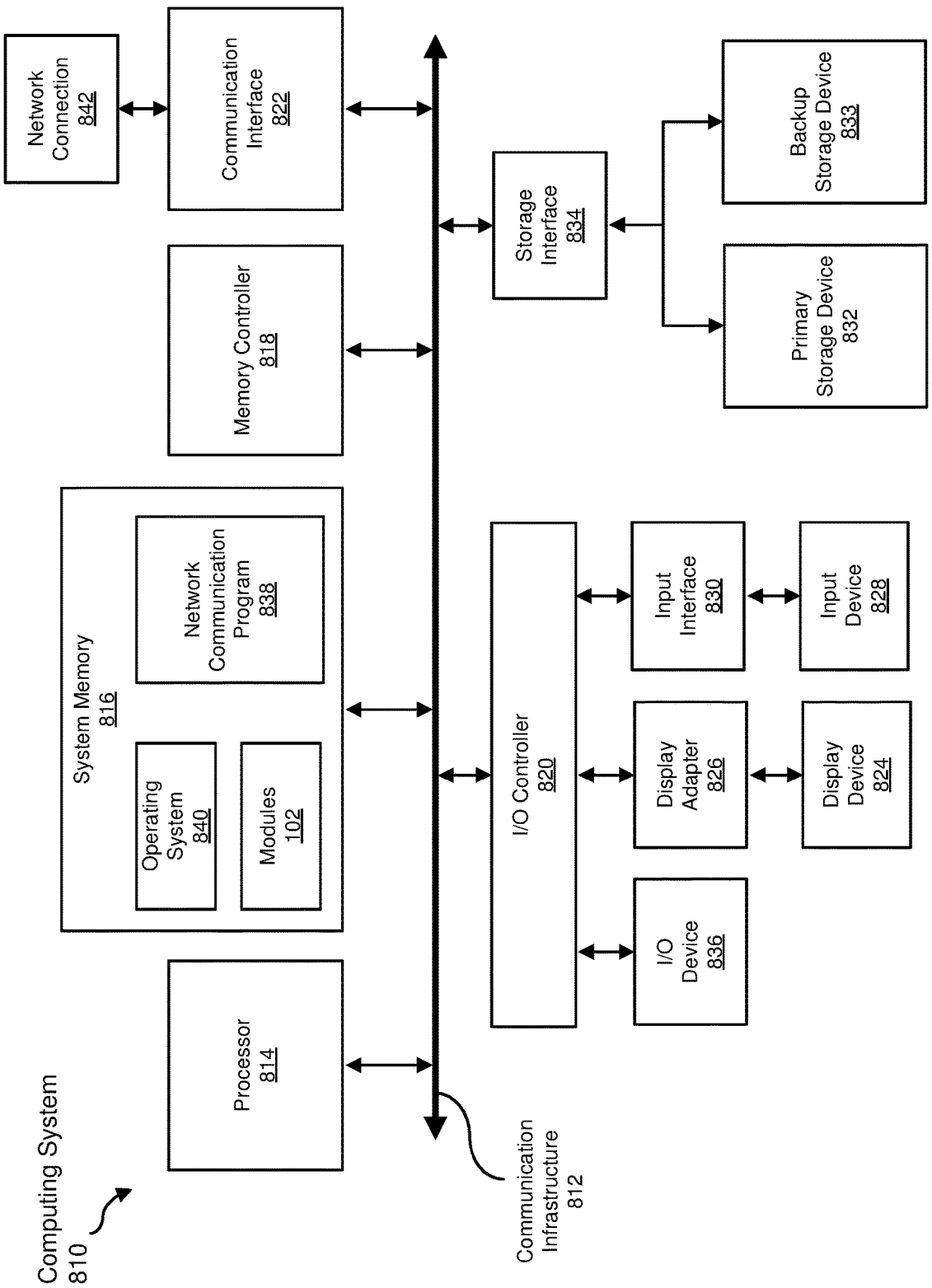
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816)

and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, installation data 120 and characteristic data 122 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
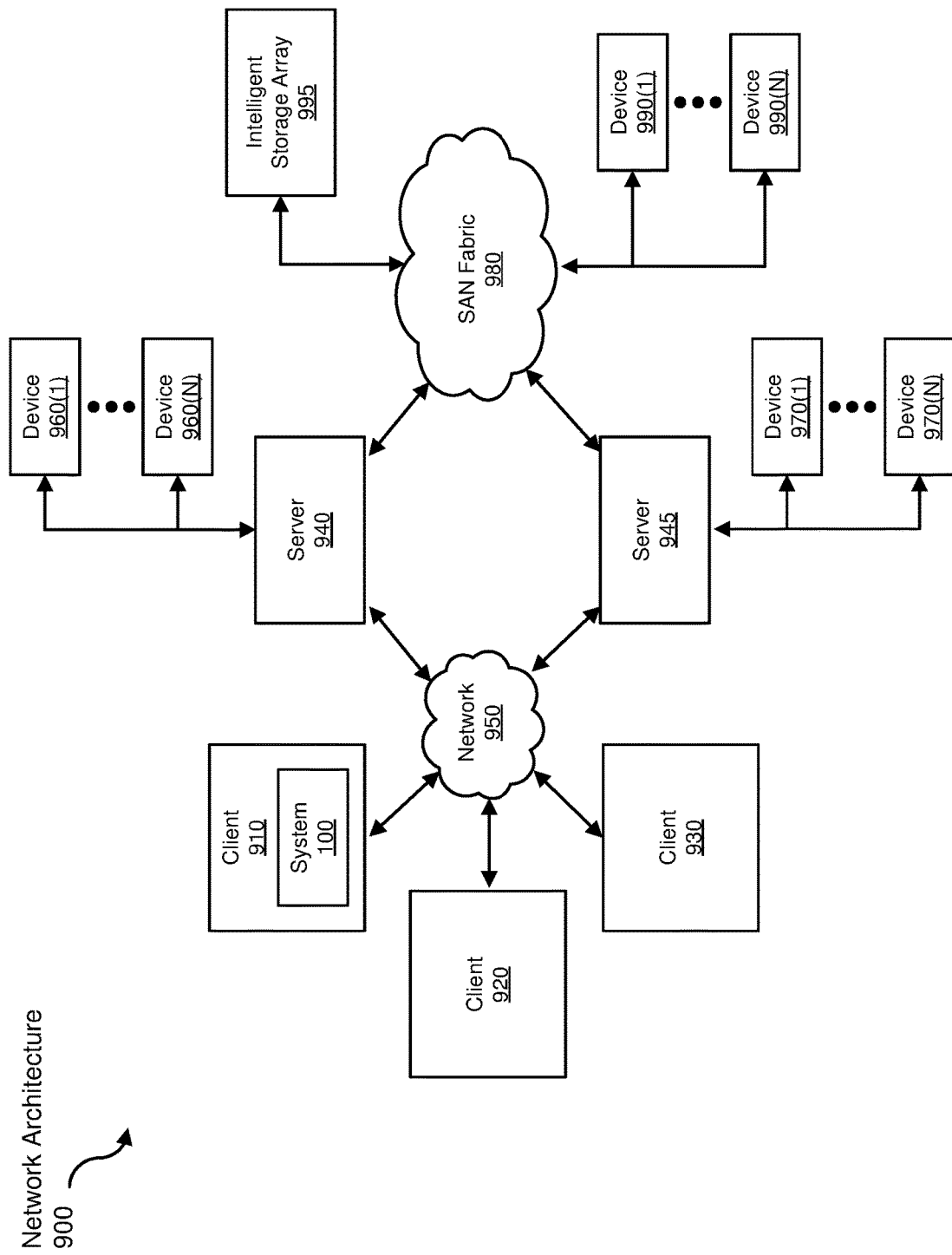
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the present disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for crowd sourced application advisory.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive characteristic data 122 to be transformed, transform the characteristic data 122 and output a result of the transformation to computing device 202. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, at least a portion of the method being performed by a computing device comprising at least one processor, the method comprising:
    analyzing a behavior of an application based on a characteristic of the application;
    generating initial data for the characteristic of the application based on the analysis;
    collecting, from each of a plurality of computing devices that run the application, respective data for the characteristic of the application based on an assessment of the application in light of the characteristic of the application;
    modifying the initial data for the characteristic based on the collected data for the characteristic;
    displaying, on a display device of the computing device, a user interface comprising an advisory for the application that includes the modified initial data for the characteristic of the application;
    receiving, via the user interface, at least one of a decision to install the application or a decision to uninstall the application on the computing device based on the advisory for the application; and
    based on determining that the data collected for the characteristic of the application is from at least a threshold number of computing devices and that data collected for the characteristic of another application is from less than the threshold number of computing devices, proportionally distributing the characteristic of the application to the characteristic of the other application comprising:
        assigning a first weight to the characteristic in association with the application reflective of the decision to install the application or to uninstall the application; and
        adjusting a second weight assigned to the characteristic in association with the other application using the first weight, the second weight for use in displaying another advisory for the other application.

2. The computer-implemented method of claim 1, wherein the data for the characteristic of the application includes data indicating whether the application was installed on the plurality of computing devices.

3. The computer-implemented method of claim 2, further comprising:
    determining that a user of the application installed the application based on the characteristic of the application; and
    updating the data for the characteristic of the application based on determining that the user of the application installed the application.

4. The computer-implemented method of claim 3, further comprising:
    collecting, from each of the plurality of computing devices that run the application, the data for the characteristic of the application that the application installation is based on.

5. The computer-implemented method of claim 3, further comprising:
    determining a degree to which the data for the characteristic of the application influences the application installation.

6. The computer-implemented method of claim 1, wherein:
    the data for the characteristic of the application is collected from each of the plurality of computing devices during a set recent time period; and
    the data for the characteristic of the application reflects an assessment of the application during the set recent time period.

7. The computer-implemented method of claim 1, wherein the characteristic of the application comprises at least one of a battery current consumption, a network data usage, a frequency of advertisement presentation, a frequency of pop-up windows, a memory storage usage, and a level of data privacy.

8. The computer-implemented method of claim 1, wherein the assessment of the application in light of the characteristic of the application is measured by a ratio of a number of users of the plurality of computing devices that have installed the application to a number of users of the plurality of computing devices that have not installed the application.

9. A system for crowd sourced application advisory, the system comprising:
at least one physical processor; and
physical memory comprising computer-executable instructions that, when executed by the physical processor, cause the physical processor to:
analyze a behavior of an application based on a characteristic of the application;
generate initial data for the characteristic of the application based on the analysis;
collect, from each of a plurality of computing devices that run the application, respective data for the characteristic of the application based on an assessment of the application in light of the characteristic of the application;
modify the initial data for the characteristic based on the collected data for the characteristic;
display, on a display device of the computing device, a user interface comprising an advisory for the application that includes the modified initial data for the characteristic of the application;
receive, via the user interface, at least one of a decision to install the application or a decision to uninstall the application on the computing device based on the advisory for the application; and
based on determining that the data collected for the characteristic of the application is from at least a threshold number of computing devices and that data collected for the characteristic of another application is from less than the threshold number of computing devices, proportionally distribute the characteristic of the application to the characteristic of the other application comprising:
assigning a first weight to the characteristic in association with the application reflective of the decision to install the application or to uninstall the application; and
adjusting a second weight assigned to the characteristic in association with the other application using the first weight, the second weight for use in displaying another advisory for the other application.

10. The system of claim 9, wherein the data for the characteristic of the application includes data indicating whether the application was installed on the plurality of computing devices.

11. The system of claim 10, further comprising:
determining that the user of the application installed the application, wherein the user of the application installed the application based on the characteristic of the application; and
updating the data for the characteristic of the application based on determining that the user of the application installed the application.

12. The system of claim 11, further comprising:
collecting, from each of the plurality of computing devices that run the application, the data for the characteristic of the application that the application installation is based on.

13. The system of claim 11, further comprising:
determining a degree to which the data for the characteristic of the application influences the application installation.

14. The system of claim 9, wherein:
the data for the characteristic of the application is collected from each of the plurality of computing devices during a set recent time period; and
the data for the characteristic of the application reflects an assessment of the application during the set recent time period.

15. The system of claim 9, wherein the characteristic of the application comprises at least one of a battery current consumption, a network data usage, a frequency of advertisement presentation, a frequency of pop-up windows, a memory storage usage, and a level of data privacy.

16. A non-transitory computer-readable medium comprising one or more computer-executable instructions that, when executed by at least one processor of a computing device, cause the computing device to:
analyze a behavior of an application based on a characteristic of the application;
generate initial data for the characteristic of the application based on the analysis;
collect, from each of a plurality of computing devices that run the application, respective data for the characteristic of the application based on an assessment of the application in light of the characteristic of the application;
modify the initial data for the characteristic based on the collected data for the characteristic;
display, on a display device of the computing device, a user interface comprising an advisory for the application that includes the modified initial data for the characteristic of the application;
receive, via the user interface, at least one of a decision to install the application or a decision to uninstall the application on the computing device based on the advisory for the application; and
based on determining that the data collected for the characteristic of the application is from at least a threshold number of computing devices and that data collected for the characteristic of another application is from less than the threshold number of computing devices, proportionally distribute the characteristic of the application to the characteristic of the other application comprising:
assigning a first weight to the characteristic in association with the application reflective of the decision to install the application or to uninstall the application; and
adjusting a second weight assigned to the characteristic in association with the other application using the first weight, the second weight for use in displaying another advisory for the other application.

17. The non-transitory computer-readable medium of claim 16, wherein the data for the characteristic of the application includes data indicating whether the application was installed on the plurality of computing devices.

18. The non-transitory computer-readable medium of claim 17, further comprising:

determining that a user of the application installed the application based on the characteristic of the application; and updating the data for the characteristic of the application based on determining that the user of the application installed the application.

19. The non-transitory computer-readable medium of claim 18, further comprising:

collecting, from each of the plurality of computing devices that run the application, the data for the characteristic of the application that the application installation is based on.

20. The non-transitory computer-readable medium of claim 18, further comprising:

determining a degree to which the data for the characteristic of the application influences the application installation.

* * * * *